United States Patent
Barezzani

(10) Patent No.: US 12,025,168 B2
(45) Date of Patent: Jul. 2, 2024

(54) TORSION SHEAR BOLT FOR ELECTRIC JUNCTIONS

(71) Applicant: CEMBRE S.P.A., Brescia (IT)

(72) Inventor: Gualtiero Barezzani, Brescia (IT)

(73) Assignee: Cembre S.P.A., Brescia (IT)

( * ) Notice: Subject to any disclaimer, the term of this patent is extended or adjusted under 35 U.S.C. 154(b) by 355 days.

(21) Appl. No.: 17/425,306

(22) PCT Filed: Feb. 5, 2020

(86) PCT No.: PCT/IB2020/050924
§ 371 (c)(1),
(2) Date: Jul. 22, 2021

(87) PCT Pub. No.: WO2020/161644
PCT Pub. Date: Aug. 13, 2020

(65) Prior Publication Data
US 2022/0099131 A1   Mar. 31, 2022

(30) Foreign Application Priority Data

Feb. 5, 2019   (IT) .................. 102019000001625

(51) Int. Cl.
*F16B 31/02*   (2006.01)
*F16B 35/00*   (2006.01)
(Continued)

(52) U.S. Cl.
CPC .......... *F16B 31/021* (2013.01); *F16B 35/005* (2013.01); *F16B 37/14* (2013.01); *H01R 4/366* (2013.01)

(58) Field of Classification Search
CPC ........... F16B 35/005; F16B 37/14; H01R 4/36
(Continued)

(56) References Cited

U.S. PATENT DOCUMENTS 2,627,778 A * 2/1953 Hodell .................. A47G 3/00
                                                  261/DIG. 38
5,266,057 A * 11/1993 Angel, Jr. ............ H01R 4/5025
                                                  439/798
(Continued)

FOREIGN PATENT DOCUMENTS

EP          1911981 B1   11/2011
WO          9631706 A1   10/1996
WO       2018102118 A1    6/2018

OTHER PUBLICATIONS

International Search Report for International Patent Application No. PCT/IB2020/050924, mailed May 6, 2020.

*Primary Examiner* — Flemming Saether
(74) *Attorney, Agent, or Firm* — Armstrong Teasdale LLP

(57) ABSTRACT

A shear bolt for a junction of electrical conductors includes a tool seat for engagement of the shear bolt by a screwing tool, an externally threaded portion to be screwed in a terminal body of the junction, along a screwing axis, and a tightening portion for engaging an electrical conductor to be tightened in the terminal body. The tool seat is formed at the threaded portion and the tightening portion is connected to the threaded portion on an opposite side with respect to the tool seat. The shear bolt can be sheared in one or more programmed rupture areas in the threaded portion when exceeding a predetermined tightening torque for each of the programmed rupture areas, respectively. Even with the screw unscrewed, the tightening portion is connected to the threaded portion and is rotatable with respect to the threaded portion about the screwing axis and non-detachable from the threaded portion.

14 Claims, 6 Drawing Sheets

(51) Int. Cl.
*F16B 37/14* (2006.01)
*H01R 4/36* (2006.01)

(58) Field of Classification Search
USPC ...... 411/372.5–377, 393; 439/810, 814, 933, 439/892
See application file for complete search history.

(56) References Cited

U.S. PATENT DOCUMENTS

| | | | | |
|---|---|---|---|---|
| 5,391,028 A * | 2/1995 | Charles | ............... | F16B 37/145 |
| | | | | 411/374 |
| 5,573,361 A * | 11/1996 | Dyson | ............... | B65D 39/0029 |
| | | | | 411/908 |
| 6,074,147 A * | 6/2000 | Shu | ............... | F16B 41/005 |
| | | | | 411/258 |
| 6,209,424 B1 * | 4/2001 | Croton | ............... | H01R 4/307 |
| | | | | 81/437 |
| 6,799,402 B2 * | 10/2004 | Faxe | ............... | E04F 15/02 |
| | | | | 52/390 |
| 7,214,108 B2 * | 5/2007 | Barnett | ............... | F16B 37/047 |
| | | | | 439/797 |
| 8,317,443 B2 * | 11/2012 | Stauch | ............... | F16B 31/021 |
| | | | | 411/403 |
| 9,328,761 B2 * | 5/2016 | Cottier | ............... | F16B 37/14 |
| 10,109,931 B2 * | 10/2018 | Jaroschek | ............... | H01R 4/36 |
| 11,276,946 B2 * | 3/2022 | Newman | ............... | H01R 4/70 |
| 2009/0053940 A1 | 2/2009 | Sweeney et al. | | |
| 2016/0322715 A1 | 11/2016 | Beiler et al. | | |

\* cited by examiner

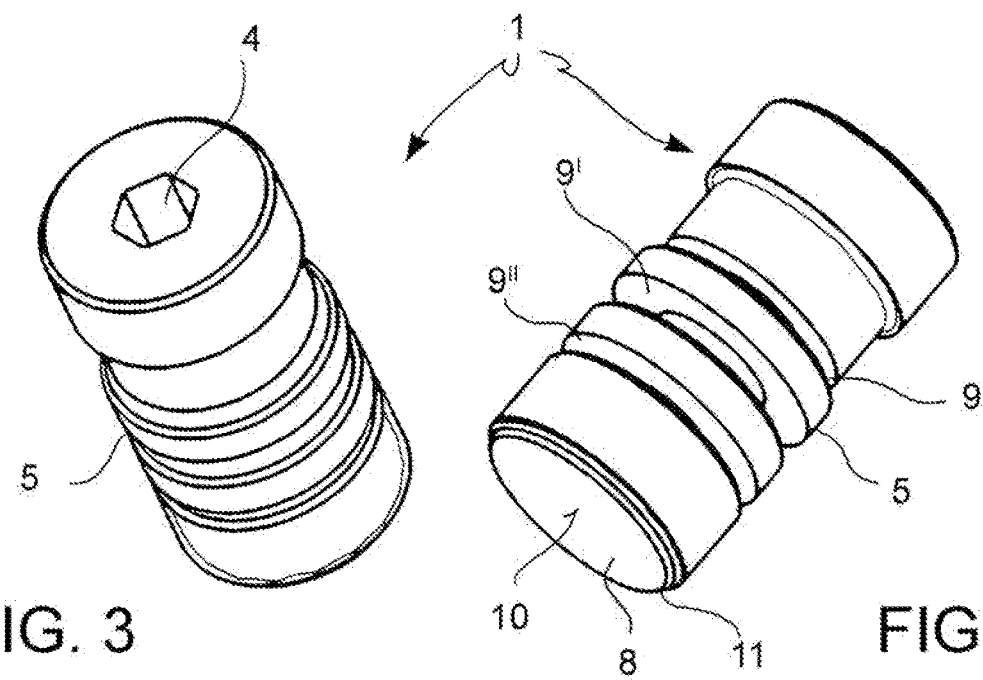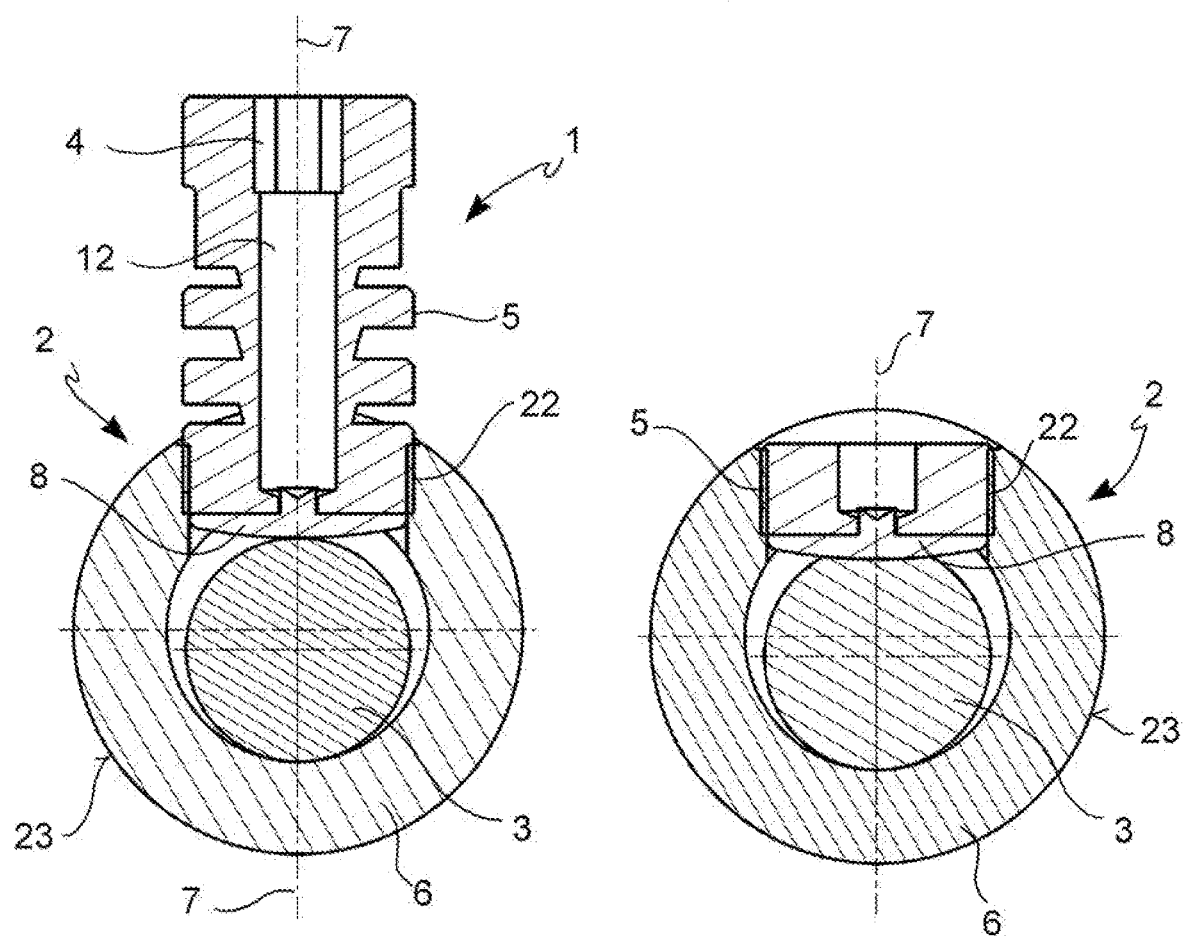

TORSION SHEAR BOLT FOR ELECTRIC JUNCTIONS

CROSS-REFERENCE TO RELATED APPLICATIONS

This application is a National Phase Application of PCT International Application No. PCT/IB2020/050924, having an International Filing Date of Feb. 5, 2020, which claims priority to Italian Application No. 102019000001625, filed Feb. 5, 2019, each of which is hereby incorporated by reference in its entirety.

FIELD OF THE INVENTION

The invention relates to a fastening device for making of an electrical contact, in particular, a torsion shear bolt (sometimes called "shear pin") with a tightening portion which can be separated by rupturing from a tool engagement portion.

BACKGROUND OF THE INVENTION

In the sector of power lines, jointing by screwing is known to provide a metal terminal body (made of electrically conductive material) forming two opposite axial holes, which are open on two opposite sides of the terminal body and each adapted to accommodate one end of respectively two electrical conductors to be connected electrically and mechanically to each other. Furthermore, the terminal body forms, at each of the two axial holes, one or more transversal threaded holes, which are open on a lateral side of the terminal body and leading into the axial hole, either transversally or radially. The aforesaid torsional shear bolts can be screwed into the transversal holes, in order to engage and lock the ends of the electrical conductors positioned in the axial holes and, in this manner, make both the electrical contact and the mechanical connection between the two electrical conductors.

Similarly, it is known to provide a metal terminal body (made of electrically conductive material) in the cable lugs forming a connection portion and an axial hole, open on one side opposite to the connection portion and adapted to accommodate one end of an electrical conductor to be electrically connected to the terminal body. Furthermore, the terminal body forms, at the axial hole, one or more transversal threaded holes, which are open on a lateral side of the terminal body and leading into the axial hole, either transversally or radially. The aforesaid torsional shear bolts can be screwed into the transversal holes, in order to engage and lock the end of the electrical conductor positioned in the axial hole and, in this manner, make both the electrical contact and the mechanical connection between the electrical conductor and the terminal body.

Layers of insulating material, e.g. polymer insulation sheaths, are applied about the terminal body after screwing and shearing (by tightening with a torque greater than a torsional resistance) of the shear bolts.

In order to have a sufficient threading engagement length for reliable tightening, the need is felt for the shear bolts to make a sheared surface which is as close to the outer end of the terminal body threading as possible. On the other hand, in order to allow the correct reconstruction of the insulation in the area of the electrical and mechanical junction, the need is felt that the shear bolts (and their sharp edges) do not protrude beyond the outer surface of the terminal body after shearing.

WO 96/31706 describes an electrical junction with torsion shear bolts provided with discrete rupture areas formed by notches in the bolt, the shearing torque (shearing resistance) of which increases from a front area facing towards the electrical conductor to a head area (tool engagement seat) of the bolt. In this manner, with a shear bolt screwed into the threading of the terminal body, the shearing is performed at the programmed rupture notch furthest from the bolt head and not completely inserted into (and therefore stabilized by) the threading of the terminal body.

The tightening force of such shear bolts, acting on an electrical conductor to be tightened, is influenced by the combination of the friction in the threading during the screwing and the friction of the head against the conductor. If the head friction, which depends on the friction coefficient between the material of the bolt and the material of the electrical conductor, becomes too great, the bolt may be sheared at a tightening force which is too low and therefore the desired long-term conservation of the tightening force will not be ensured.

Furthermore, the rotation of the tip of the shear bolt pressing against the conductor provides a milling effect that damages the conductor and further impairs the long-term contact force.

For this reason, in the prior art, the friction behavior is regulated by using lubricants or coatings of the shear bolt, making the manufacture more expensive and, however, not being able to ensure the safety of operation in all areas of application, e.g. in case of long service life and significant temperature variations.

EP1911981B1 discloses a shear bolt having a threaded portion which can be screwed onto the terminal body and a tightening portion destined to engage the electrical conductor to be tightened, in which the tightening portion is formed in one piece with the threaded portion. The shear bolt can be sheared in the threaded portion (first rupture point) upon reaching a first tightening torque and, in addition, the tightening portion can be sheared and separable from the threaded portion (second rupture point) upon reaching of a second tightening torque, combined with a corresponding axial tightening force, wherein the second tightening torque is lower than the first tightening torque in order to allow, after the rupture of the tightening portion, a rotation of the threaded portion with respect to the tightening portion which can press on the conductor without relative rotations between them.

This known solution works satisfactorily only on the condition that the two screwing torques which distinguish the first rupture from the second rupture are sufficiently far apart and of a sure value. This requires precision machining of the rupture area of the tightening portion and makes the bolt usable only for a limited range of threads and tightening torques.

The second tightening torque, which determines the rupture of the tightening portion, inevitably and significantly varies according to the type (material, single wire, strand, diameter) of conductor used and, therefore, there is no certainty about the real operation of the bolt and the moment in which the milling effect on the conductor ceases. Indeed, after partial milling of a strand, individual conductor fibers may interfere with the relative rotary movement between the threaded portion and the tightening portion and, therefore, also influence the first screwing torque which causes the bolt to rupture in the threaded portion.

Finally, the rupturing ease of the tightening portion implies the risk that, when a shear bolt is partially screwed into the transversal hole of the terminal body, during the insertion of the conductor into the axial hole, the tip of the conductor pushes against the tightening portion, detaching it from the bolt and displacing it to an unexpected position which makes the tightening bolt unusable.

SUMMARY OF THE INVENTION

It is the object of the present invention to provide a shear bolt for an electrical conductor junction device and a junction device for electrical conductors which overcome the drawbacks of the prior art.

It is a particular object of the invention to make a junction of electrical conductors suited for long service life, which is mechanically stable and capable of transmitting electrical current, regardless of the material of the electrical conductor used.

It is a further particular object of the invention to further reduce the milling effect on the conductor.

It is a further object of the invention to reduce the number of precision machining operations on the shear bolt.

These and other objects are achieved by means of a shear bolt as described and claimed herein. Advantageous and preferred embodiments of the present invention are also described.

According to an aspect of the invention, a shear bolt for a junction of electrical conductors comprises:
- a tool seat for the engagement of the shear bolt by means of a screwing tool,
- an externally threaded portion intended to be screwed in a terminal body of the junction, along a screwing axis,
- a tightening portion intended to pressure engage an electrical conductor to be tightened in the terminal body,
- wherein the tool seat is formed at the threaded portion and the tightening portion is connected to the threaded portion on an opposite side with respect to the tool seat,
- wherein the shear bolt can be sheared in one or more programmed rupture regions in the threaded portion when exceeding a predetermined tightening torque for each of the programmed rupture areas, respectively,
- wherein the tightening portion is connected to the threaded portion so as to:
- be able to rotate with respect to the threaded portion about the screwing axis and
- not to be separable or detachable from the threaded portion.

This allows the shear bolt to operate satisfactorily regardless of the value of the tightening torques which determine the programmed rupture of the threaded portion of the bolt, avoids the need for precision machining to create a special rupture area of the tightening portion, and makes the shear bolt usable without limitations with respect to the threading type and to the tightening torque value.

The shear bolt allows relative rotation between the tightening portion and the threaded portion from the first contact with the conductor, regardless of the type (material, single wire, strand, diameter) of conductor used, reliably avoiding the milling effect on the conductor.

This ensures the development of a high contact force and, at the same time, maintains the integrity of the electrical conductor, thus creating a connection suitable for long service life, which is mechanically stable and capable of transmitting electrical current, regardless of the material of the electrical conductor used.

BRIEF DESCRIPTION OF THE DRAWINGS

In order to better understand the invention and appreciate its advantages, the description of some embodiments will be provided below by way of non-limiting examples with reference to the figures, in which:

FIG. 5 is a cross-section view of an electrical junction during the step of screwing of the shear bolt (in longitudinal section) against an electrical conductor accommodated in a terminal body of the junction, FIG. 6 is a cross-section view of the electrical junction in FIG. 5 at the end of the step of screwing and after the programmed rupture of the shear bolt.

DETAILED DESCRIPTION

Figure 1:
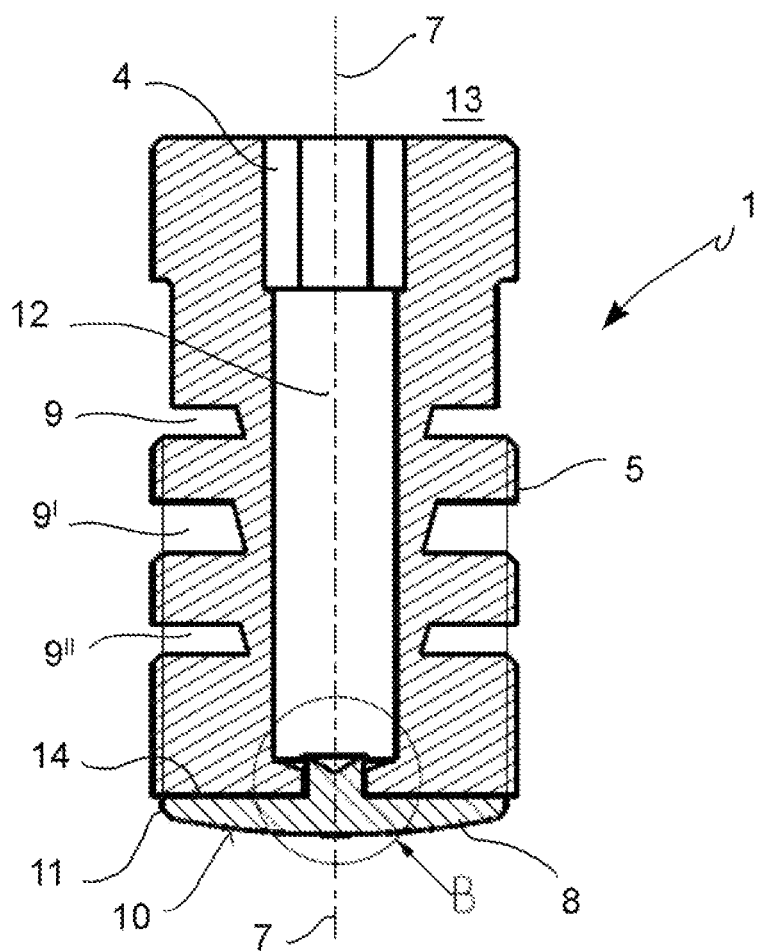
FIG. 1 is a longitudinal section view of a shear bolt according to an embodiment.
Figure 2:
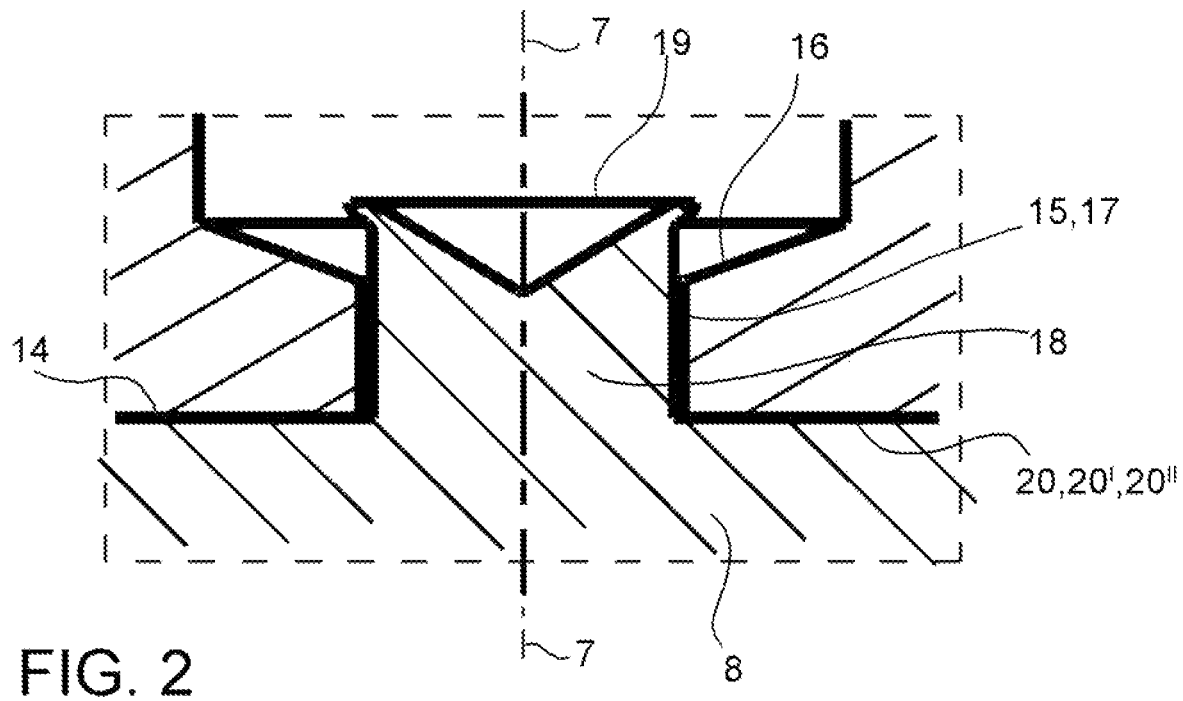
FIG. 2 is an enlarged view of a detail in FIG. 1, FIGS. 3 and 4 are perspective views of the shear bolt according to embodiments.

With reference to the figures, a shear bolt 1 for a junction 2 of electrical conductors 3, comprises;
a tool seat 4 for the engagement of the shear bolt 1 by means of a screwing tool (not shown),
an externally threaded portion 5 intended to be screwed in a terminal body 6 of the junction 2, along a screwing axis 7 (which corresponds to the longitudinal axis of the screw 1),
a tightening portion 8 intended to engage by pressing an electrical conductor 3 to be tightened in the terminal body 6,
wherein the tool seat 4 is formed at the threaded portion 5 and the tightening portion 8 is connected to the threaded portion 5 on an opposite side with respect to the tool seat 4,
wherein the shear bolt 1 can be sheared in one or more programmed rupture areas 9, 9', 9" in the threaded portion 5 when exceeding a predetermined tightening torque for each of the programmed rupture areas 9, 9', 9", respectively, wherein (even with the screw 1 unscrewed), the tightening portion 8 is connected to the threaded portion 5 so as to be able to rotate with respect to the threaded portion 5 about the screwing axis 7 and so as to be not separable or detachable from the threaded portion 5.

This allows the shear bolt 1 to operate satisfactorily regardless of the value of the tightening torques which determine the programmed rupture of the threaded portion 5 of the bolt 1, avoids the need for precision machining to create a special rupture area of the tightening portion 8, and makes the shear bolt 1 usable without limitations with respect to the threading type and the tightening torque value.

The shear bolt 1 allows relative rotation between the tightening portion 8 and the threaded portion 5 from the first contact with the conductor 3, regardless of the type (material, single wire, strand, diameter) of electrical conductor 3 used, reliably avoiding the milling effect on the electrical conductor 3.

This ensures the development of a high contact force and, at the same time, maintains the integrity of the electrical conductor 3, thus creating a connection suitable for long service life, which is mechanically stable and capable of transmitting electrical current, regardless of the material of the electrical conductor 3 to be tightened.

According to an embodiment, the tightening portion 8 forms a tightening surface 10 facing in an opposite direction with respect to the tool seat 4 and intended to make the contact with the electrical conductor 3. Advantageously, the tightening surface 10 is continuous, but not planar, preferably domed in a convex manner, e.g. with uniform curvature, preferably a spherical surface segment (FIGS. 4, 5, 6), even more preferably the tightening surface 10 is axial-symmetrical with respect to the screwing axis 7. This allows to reduce the milling effects on the conductor 3 as much as possible and, furthermore, increases the contact area between the tightening surface 10 and the conductor clamped by it, resulting in lower electrical contact resistance and a larger friction area with greater anti-extraction resistance.

Furthermore, the domed shape of the tightening surface 10, e.g. with respect to a planar surface, avoids the notching effect on the electrical conductor 3 which would occur at the peripheral edge of a planar surface.

According to an alternative embodiment, the tightening surface is basically planar.

With additional advantage, a peripheral edge 11 formed about the tightening surface 10 is further retracted with respect to the latter, e.g. by means of a chamfering (FIGS. 1, 4).

Figure 22:
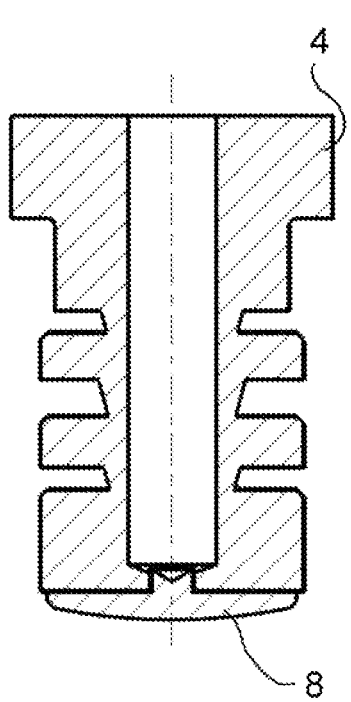
FIGS. 22 and 23 are section and perspective views of a shear bolt according to a further embodiment.
Figure 23:
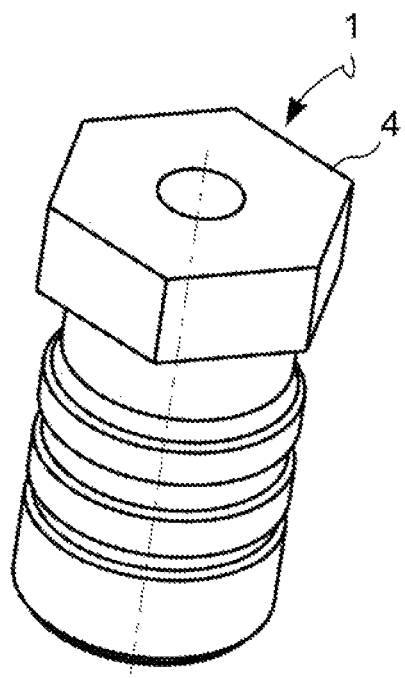

According to an embodiment, the threaded portion 5 forms a longitudinal hole 12, which is concentric with respect to the screwing axis 7 and open on a side opposite to the tightening portion 8. The longitudinal hole 12 may form the aforesaid tool seat 4, e.g. a recessed hexagonal seat (FIG. 3) or a hexagonal head with an external hexagon (FIGS. 22, 23), advantageously at a rear end 13 (head) of the shear bolt 1. This allows the engagement of the bolt 1 by means of a screwing tool in a region far from the programmed rupture areas 9, 9', 9".

The longitudinal hole 12 is preferably not threaded internally to avoid additional notching effects which could adversely affect the programmed rupture certainty in the programmed rupture areas 9', 9', 9".

However, the longitudinal hole 12 could be a frusto-conical or a variable diameter stepped hole so as to define (or contribute to the definition of) the positions of the programmed rupture areas 9, 9', 9".

According to a preferred embodiment, the longitudinal hole 12 is a through-hole also open on a front end 14 of the threaded portion 5, facing towards the tightening portion 8, and makes a hinge- and anti-extraction-anchoring seat 15 (hereinafter anti-extraction seat 15 for the sake of brevity) for the tightening portion 8.

According to an embodiment, the anti-extraction seat 15 forms a hole portion 17 with a smaller inner diameter than the inner diameter of a directly bordering portion of the longitudinal hole 12, as well as an inner shoulder 16 facing the tool seat 4. The tightening portion 8, in turn, forms a pin 18 having an enlarged end 19 (e.g. outstretched or mushroom head). The pin 18 is inserted into the hole portion 17 with a smaller diameter and the enlarged end 19 is trapped by the inner shoulder 16 so as to prevent the tightening portion 8 from detaching from the threaded portion 5.

The engagement between the inner shoulder 16 of the anti-extraction seat 15 and the enlarged end 19 of the tightening portion 8 performs an additional important function. It determines a maximum permissible thickness of a gap or sliding interface 20 between the tightening portion 8 and the threaded portion 5.

Such a sliding interface 20, formed between two, advantageously planar and possibly lubricated, opposite sliding surfaces 20', 20" is preferably reduced (e.g. in the order of a few tenths of a millimeter) to avoid the introduction of foreign bodies or conductor strand fibers, or by only a few thousandths of a millimeter to facilitate lubrication.

The tightening portion 8 is therefore preferably a rotationally symmetrical body with a domed circular disc portion on a front side and planar on a rear side and with the aforesaid pin 18 protruding from the rear side of the disc and ending at the enlarged end 19.

According to an embodiment, the programmed rupture areas 9, 9', 9" comprise annular cavities formed in an outer surface of the threaded portion 5 and defining, together with the longitudinal hole 12, portions (of material) of locally reduced section, the shearing torques (shear resistance) of which increase going from the front end 14 to the rear end 13 of the threaded portion 5.

In this manner, during the screwing of the shear bolt 1 into the threading of the terminal body 6, the shearing is performed at the programmed rupture notch furthest from the bolt head and not completely inserted into and retained by the threading of the terminal body 6.

Preferably, the bolt 1 forms three of said programmed rupture areas 9', 9', 9".

The bolt 1 is made of electrically conductive and preferably corrosion-resistant metal material, e.g. brass.

The rotational connection of the tightening portion 8 to the threaded portion 5, with respect to their manufacturing in one piece, implies the additional advantage of being able to make the two components of different materials, e.g. a tightening portion material specifically suited to make electrical contact with the electrical conductor 3 and a threaded portion material specifically suited for the threaded engagement with the terminal body 6.

Figure 20:
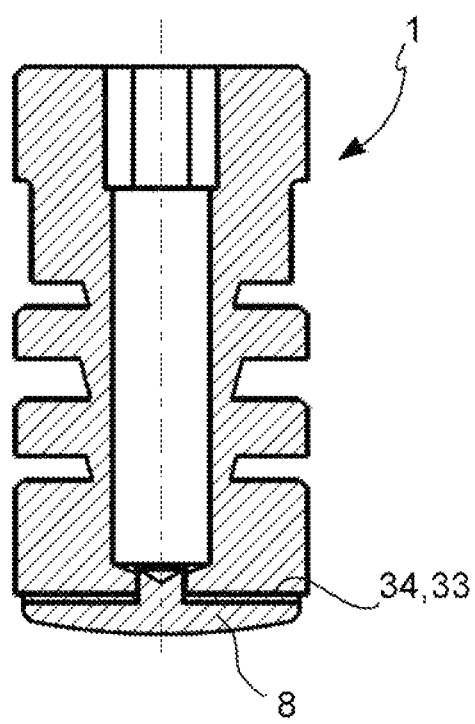
FIGS. 20 and 21 are section views of shear bolts according to further embodiments.
Figure 21:
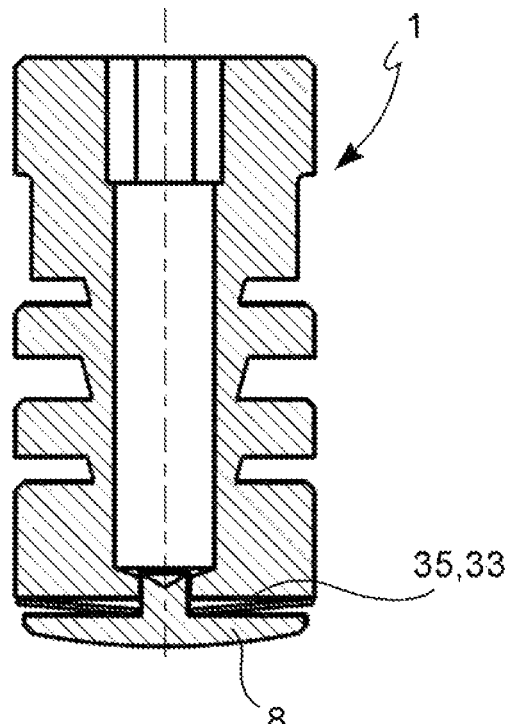

According to an embodiment, the shear bolt 1 comprises a third element 33 interposed between the threaded portion 5 and the tightening portion 8, e.g. a disc or layer of anti-friction material 34 (FIG. 20) to lower the relative rotational friction, or an elastic element 35 (FIG. 21) to recover clearance between the tightening portion 8 and the threaded portion 5.

Figure 7:
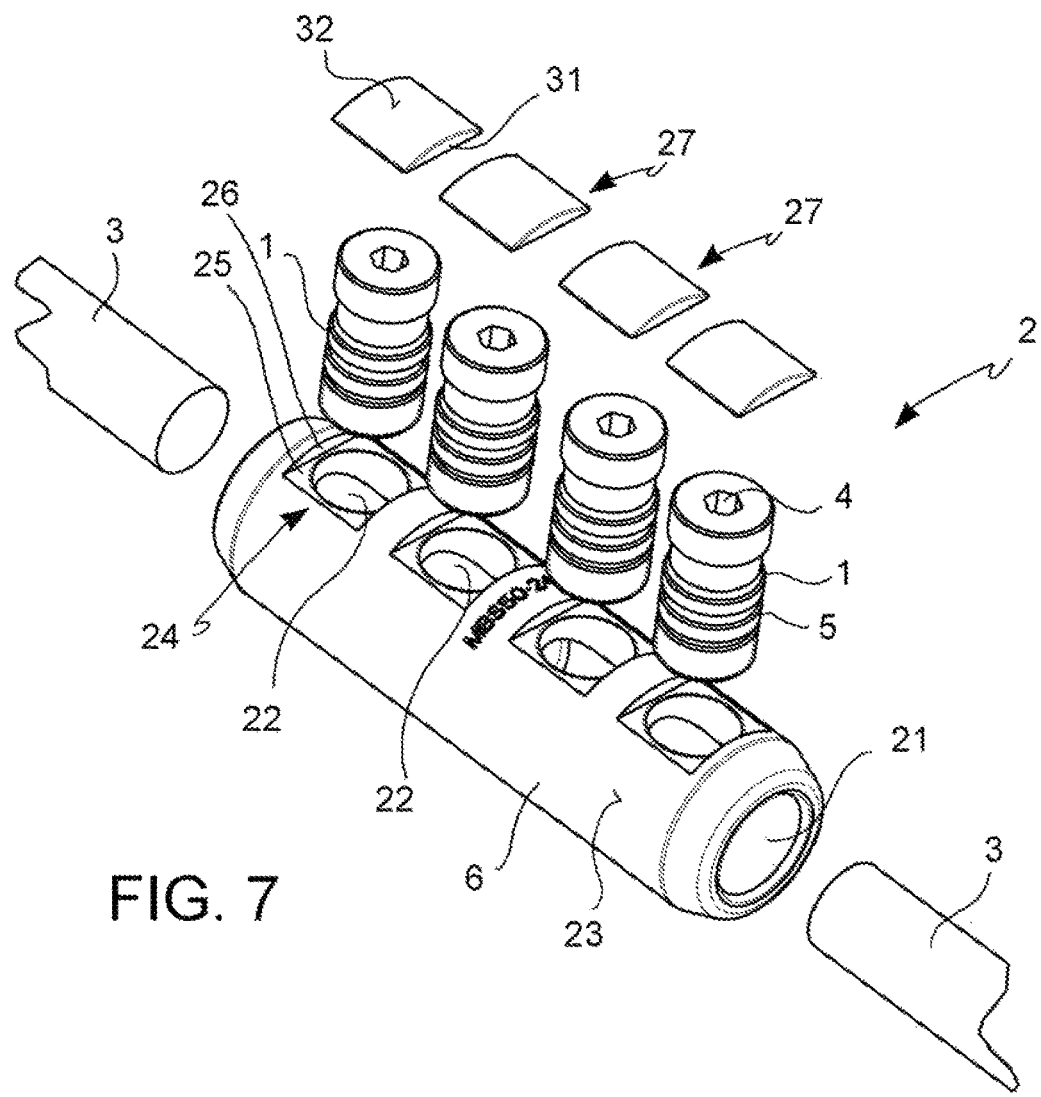
FIG. 7 is an exploded view of an electrical junction device according to an embodiment.
Figure 8:
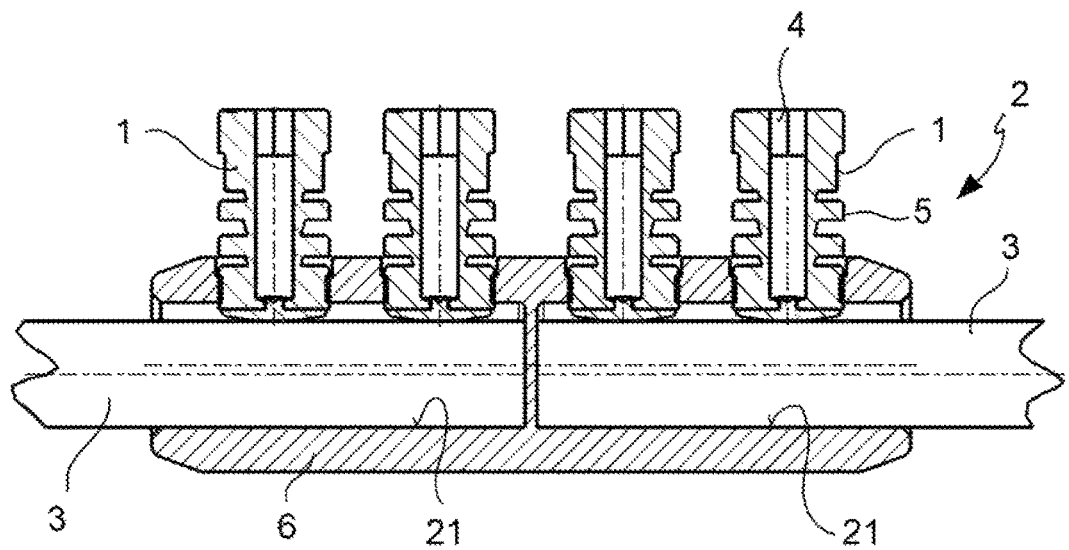
FIG. 8 is a longitudinal section view of the electrical junction device in FIG. 7 in a step of screwing of the shear bolts.
Figure 9:
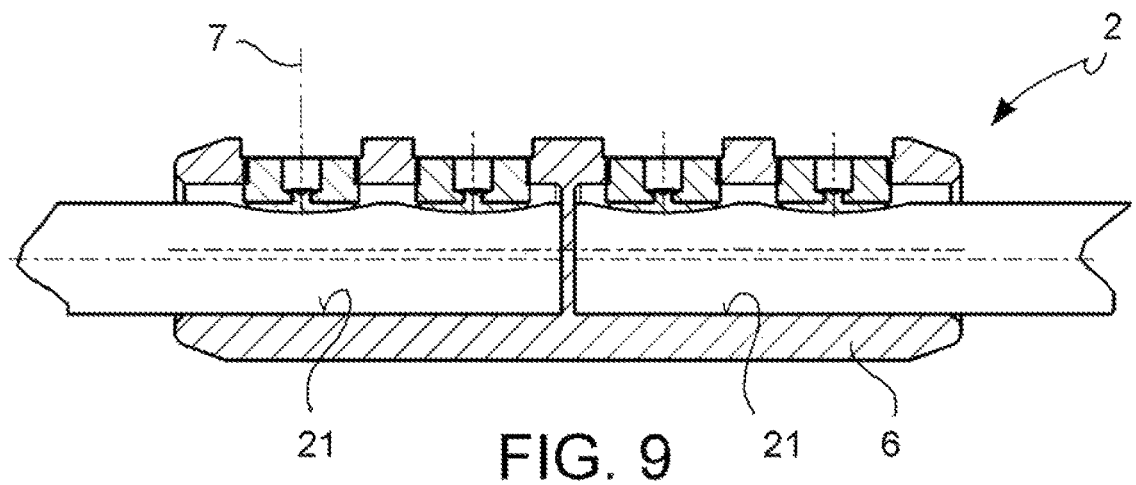
FIG. 9 shows the electrical junction device in FIG. 5 at the end of the step of screwing and after the programmed rupture of the shear bolts.
Figure 10:
FIG. 10 is a perspective view of the electrical junction completed by means of closing caps, but not yet covered by external insulating layers, according to an embodiment.
Figure 11:
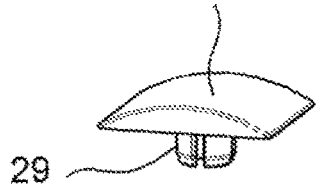
FIGS. 11, 12, 13 are perspective views of a closing cap for the electrical junction device according to an embodiment.
Figure 12:
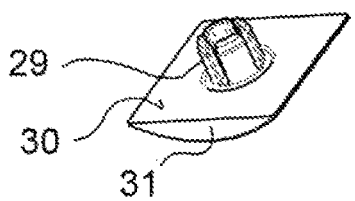
Figure 13:
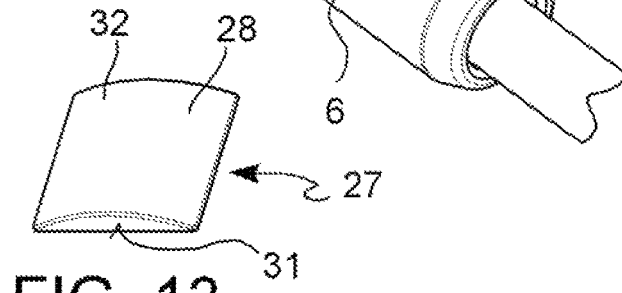
Figure 14:
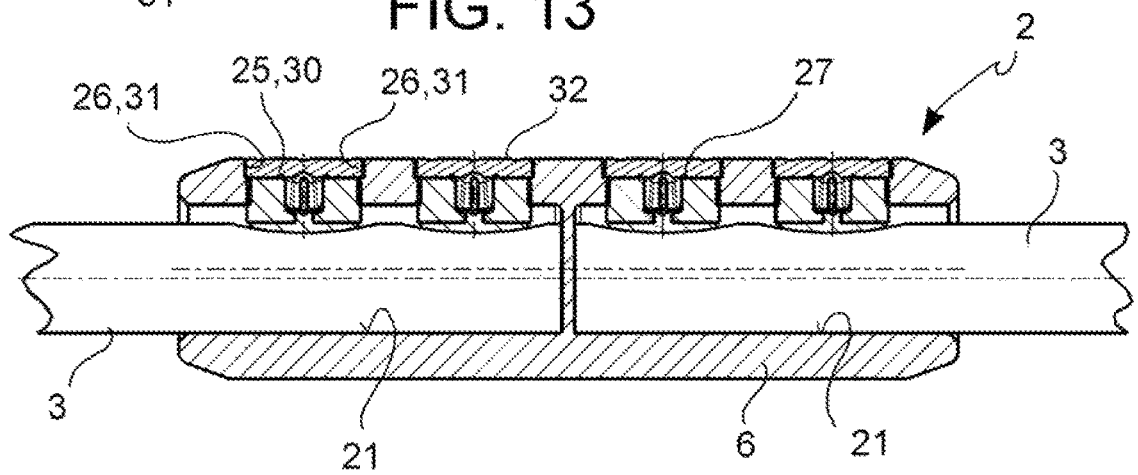
FIG. 14 is a longitudinal section view of the electrical junction in FIG. 10.
Figure 15:
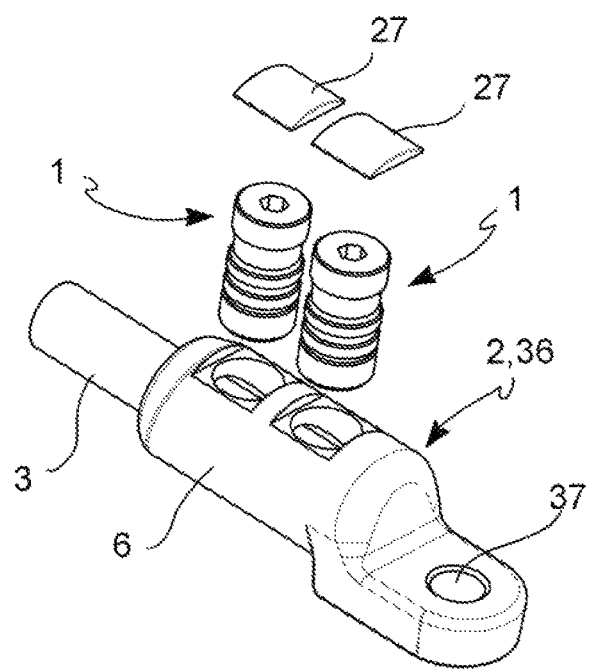
FIG. 15 is an exploded view of an electrical junction device, forming a terminal, according to an embodiment.
Figure 16:
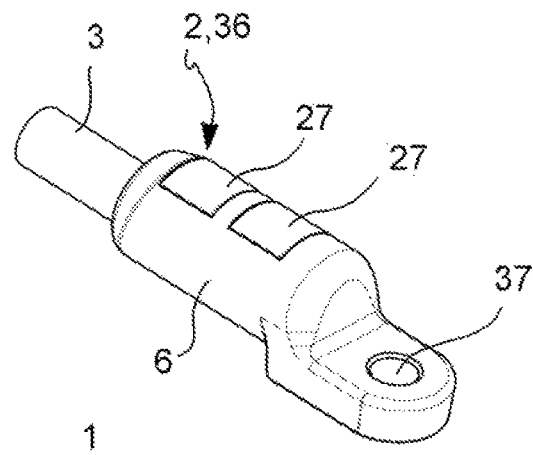
FIG. 16 is a perspective view of the electrical junction in FIG. 15 completed by means of closing caps, but not yet covered by external insulating layers, according to an embodiment.

The metal terminal body 6 forms two opposite axial holes 21, e.g. concentric, each open on respectively one of two opposite sides of the terminal body 6 and adapted to accommodate an end of electrical conductor 3. Furthermore, the terminal body 6 forms, at each of the two axial holes 21, one or more transversal internally threaded holes 22, which are open on a lateral side of the terminal body 6 and leading into the axial hole 21, either transversally or radially (FIGS. 7, 8).

The shear bolts 1 can be screwed into the transversal holes 22 to engage and lock the ends of the electrical conductors 3 positioned in the axial holes 21 and, in this manner, make both the electrical contact and the mechanical connection between the two electrical conductors 3.

Figure 17:
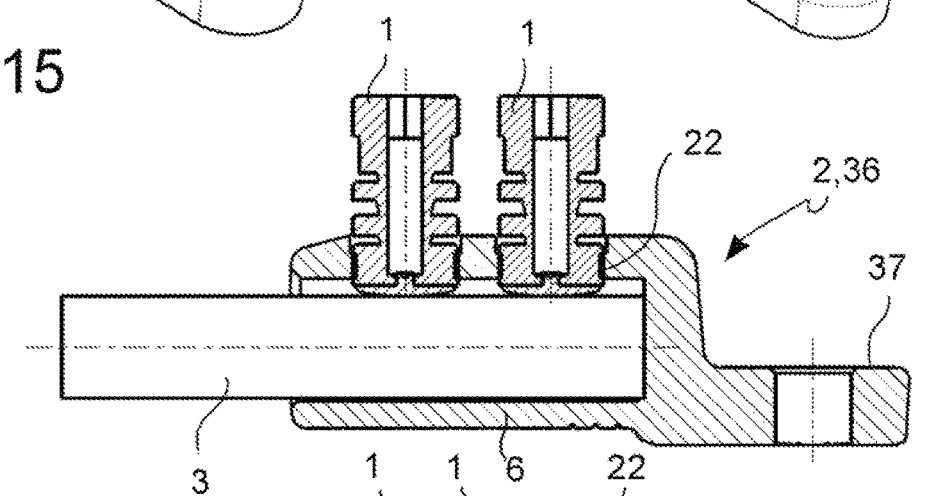
FIG. 17 is a longitudinal section view of the electrical junction device in FIG. 15 in a step of screwing of the shear bolts.
Figure 18:
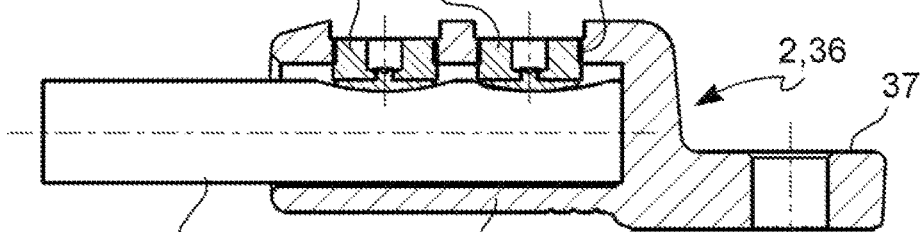
FIG. 18 shows the electrical junction device in FIG. 15 at the end of the step of screwing and after the programmed rupture of the shear bolts.
Figure 19:
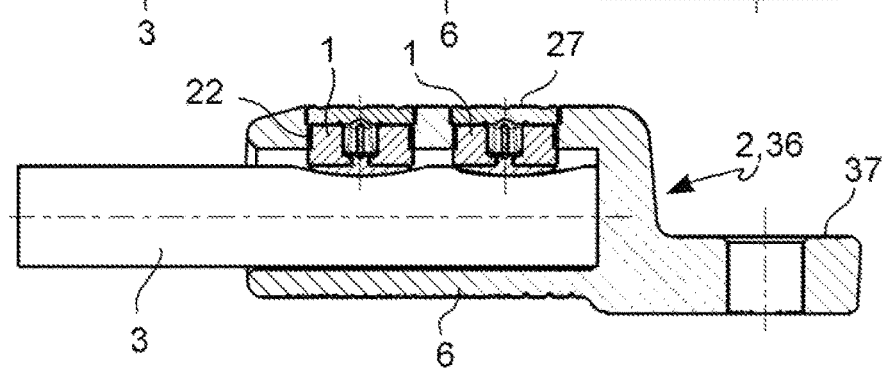
FIG. 19 shows the electrical junction device in FIG. 18 with closing caps.

Similarly, in the case in which the electrical junction device 2 forms a lug 36 (FIGS. 15-19), the metal terminal body 6 forms an axial hole 21 which is open on the opposite side with respect to a connection portion 37, e.g. ring-shaped or open-mouthed, and adapted to accommodate an end of electrical conductor 3. The terminal body 6 further forms one or more internally threaded transversal holes 22 at the axial hole 21, which are open on a lateral side of the terminal body 6 and leading into the axial hole 21, either transversally or radially (FIG. 17-19).

The shear bolts 1 can be screwed into the transversal holes 22 to engage and lock the end of the electrical conductor 3 positioned in the axial hole 21 and, in this manner, make both the electrical contact and the mechanical connection between the electrical conductor 3 and the terminal body 6.

Layers of insulating material (not shown), e.g. polymer insulation sheaths, are applied about the terminal body 6 after the screwing and the shearing of the shear bolts 1.

In order to protect the external electrical insulation from shearing edges of bolts 1, it is known to apply a protective cap onto each bolt 1 and/or each transversal hole 22.

However, due to the curvature of the outer surface of the terminal body 6 and the variability of the angular position of the bolts 1, the caps of the prior art tipically do not match the outer surface of the terminal body 6 precisely, forming steps or cavities which create undesired gaps between the outer insulating layer and the terminal body 6.

According to an embodiment, the terminal body 6 forms a cylindrical outer surface 23, and at each transversal hole 22, a cap seat 24 is machined in the outer surface 23 with a substantially flat bottom 25, in which the transversal hole 22 opens, and two positioning surfaces 26, which are opposite and transversal, e.g. perpendicular, to the bottom 25 (FIG. 7). The cap seat 24 is adapted to accommodate a cap 27 (preferably made of polymeric material) having a closing portion 28 of shape complementary to that of the cap seat 24 and an anchoring protrusion 29, which can be inserted by interference into the longitudinal hole 12 of the bolt 1 screwed into the transversal hole 22.

The closing portion 28 forms:

a planar support surface 30 intended to rest on the bottom 25 of the cap seat 24, and two counter-positioning surfaces 31 opposite to each other, which are transversal, e.g. perpendicular, to the support surface 30, and intended to be positioned or facing against the positioning surfaces 26 of the cap seat 24, as well as an outer surface 32, opposite to the support surface 30 and having the same curvature as the curvature of the cylindrical outer surface 23 of the terminal body 6, wherein, with the cap 27 being positioned in the cap seat 24, the outer surface 32 of the closing portion 28 makes a cylindrical continuity of the cylindrical outer surface 23 of the terminal body.

In order to prevent an incorrect angular positioning of the cap 27, the shape and position of the positioning surfaces 26 and the shape and position of the counter-positioning surfaces 31 are such to allow the insertion of the closing portion 28 into the cap seat 24 in planned angular position, e.g. in two angular positions rotated by 180°.

Advantageously, the closing portion 28 has an extension parallel to the support surface 30 in the extension direction of the counter-positioning surfaces 31, which is greater than a distance between the two counter-positioning surfaces 31.

Preferably, the closing portion 28 and the cap seat 24 both have a rectangular shape.

Along two first opposite sides (of the rectangular shape) of the closing portion 28, the outer surface 32 and the support surface 30 are spaced apart from each other by the counter-positioning surfaces 31, and along two second opposite sides (of the rectangular shape) of the closing portion 28, the outer surface 32 and the support surface 30 meet at a common edge with an acute angle, which may be sharp or slightly rounded.

Similarly, along two first opposite sides (of the rectangular shape) of the cap seat 24, the bottom 25 of the cap seat 24 and the cylindrical outer surface 23 of the terminal body 6 are spaced apart from each other by the positioning surfaces 26, and along two second opposite sides (of the rectangular shape) of the cap seat 24, the bottom 25 and the cylindrical outer surface 23 meet at a common edge with an obtuse angle, which may be sharp or slightly rounded.

This makes it easy to make the cap by injection molding and the cap seat 24 can be easily machined by flat milling. Furthermore, the volume and mass of the cap 27 and also the amount of waste material removed from the terminal body 6 can be kept very low.

The anchoring protrusion 29 may comprise a number of flexible tongues, adapted to elastically engage the longitudinal hole 12 of the shear bolt 1.

In order to reduce or avoid the formation of electrical charges at the geometric discontinuities of the terminal body 6 at the transversal holes 22, it is advantageous to form caps 27 made of electrically conductive polymer material, e.g.:

extrinsically conductive polymer (ECP), filled with electroconductive metal powders (e.g. copper) or graphite, or intrinsically conductive polymers (ICP), also called semiconductor polymers, in which the polymer is filled with electron-acceptor substances which increase the number of electronic gaps, e.g. polymers with a polyenic structure, e.g. polyparaphenylene (PPP), polyparaphenylenesulphide (PPS), polyparaphenylenvinylene (PPV), polyaniline (PANI), polypyrrole (PPy), polythiophene (PT), polyisothiaphene (PITN) and polyethylenedioxythiophene (PEDOT).

A person skilled in the art will appreciate that the features of the cap 27 and of the cap seat 24 of the terminal body 6 while being in synergy with some features of the shear bolt 1, are advantageous even if applied to junction devices with shear bolts different from the shear bolt 1 described hereto.

What is claimed is:

1. An electrical junction device (2) comprising:
    A) a metal terminal body (6) with:
        at least one axial hole (21) which is open on an outer side of the terminal body (6) and adapted to accommodate an electrical conductor end (3),
        one or more transversal holes (22) at the axial hole (21), said transversal holes (22) being internally threaded, open on a lateral side of the terminal body (6) and leading into the axial hole (21),
    B) a plurality of shear bolts (1) which can be screwed into the transversal holes (22) to lock the electrical conductor end (3) in the axial hole (21),
    wherein:

the terminal body (6) forms a cylindrical outer surface (23),
a cap seat (24) adapted to receive a cap (27) of the electrical junction (2) is formed in the cylindrical outer surface (23) at each transversal hole (22), the cap seat (24) forming a substantially planar bottom (25), in which the transversal hole (22) opens, and two opposite positioning surfaces (26) transversal to the bottom (25),
the cap (27) forms an outer surface (32) having the same curvature as the curvature of the cylindrical outer surface (23) of the terminal body (6) and comprises a closing portion (28) having a shape which is complementary to the shape of the cap seat (24),
the closing portion (28) forms a planar support surface (30) resting on the bottom (25) of the cap seat (24), and two opposite counter-positioning surfaces (31) transversal to the support surface (30), positioned or facing against the positioning surfaces (26) of the cap seat (24), as well as said outer surface (32) opposite the support surface (30) and having said curvature which is identical to the curvature of the cylindrical outer surface (23) of the terminal body (6), and
with the cap (27) being positioned in the cap seat (24), the outer surface (32) of the cap (27) and the outer surface (32) of the closing portion (28) form forms a cylindrical continuity with the cylindrical outer surface (23) of the terminal body (6).

2. The electrical junction device (2) of claim 1, wherein the shape and position of the positioning surfaces (26) and the shape and position of the counter-positioning surfaces (31) are such as to allow the insertion of the closing portion (28) into the cap seat (24) only in a predetermined relative position.

3. The electrical junction device (2) of claim 2, wherein the closing portion (28) has an extension parallel to the support surface (30) in the extension direction of the counter-positioning surfaces (31), which is greater than a distance between the two counter-positioning surfaces (31).

4. The electrical junction device (2) of claim 1, wherein both the closing portion (28) and the cap seat (24) are rectangular in shape.

5. The electrical junction device (2) of claim 1, wherein:
along two first opposite sides of the closing portion (28), the outer surface (32) and the support surface (30) are spaced apart from each other by the counter-positioning surfaces (31), and along two second opposite sides of the closing portion (28), the outer surface (32) and the support surface (30) meet at a common edge with an acute angle,
along two first opposite sides of the cap seat (24), the bottom (25) of the cap seat (24) and the cylindrical outer surface (23) of the terminal body (6) are spaced apart from each other by the positioning surfaces (26), and along two second opposite sides of the cap seat (24), the bottom (25) and the cylindrical outer surface (23) meet at a common edge with an obtuse angle.

6. The electrical junction device (2) of claim 1, wherein the cap (27) forms an anchoring protrusion (29) which can be inserted, by interference, into a longitudinal hole (12) of the shear bolt (1) screwed in the transversal hole (22).

7. The electrical junction device (2) of claim 1, wherein the caps (27) are made of an electrically conducting polymer material selected from the group consisting of extrinsically conducting polymers and intrinsically conducting polymers.

8. The electrical junction device (2) of claim 1, said shear bolt (1) comprising:
a tool seat (4) for the engagement of the shear bolt (1) by means of a screwing tool,
an externally threaded portion (5) intended to be screwed in a terminal body (6) of the junction (2), along a screwing axis (7),
a tightening portion (8) intended to engage an electrical conductor (3) to be tightened in the terminal body (6),
wherein the tool seat (4) is formed at the threaded portion (5) and the tightening portion (8) is connected to the threaded portion (5) on an opposite side with respect to the tool seat (4),
wherein the shear bolt (1) can be sheared in one or more programmed rupture areas (9, 9', 9") in the threaded portion (5) when exceeding a predetermined tightening torque for each of the programmed rupture areas (9, 9', 9"), respectively, and
wherein, even with the screw (1) unscrewed, the tightening portion (8) is connected to the threaded portion (5) so as to be able to rotate with respect to the threaded portion (5) about the screwing axis (7) and so as to be non-detachable from the threaded portion (5).

9. The electrical junction device (2) of claim 8, wherein the tightening portion (8) forms a tightening surface (10) facing in an opposite direction with respect to the tool seat (4) and intended to make the contact with the electrical conductor (3), said tightening surface (10) being continuous and domed in a convex manner.

10. The electrical junction device (2) of claim 9, wherein the tightening surface (10) forms an axial-symmetrical spherical surface segment with respect to the screwing axis (7).

11. The electrical junction device (2) of claim 8, wherein the threaded portion (5) forms a longitudinal hole (12) which is open on an opposite side with respect to the tightening portion (8).

12. The electrical junction device (2) of claim 11, wherein the longitudinal hole (12) is a through hole which extends through the threaded portion (5), and the longitudinal hole (12) makes an anti-extraction and hinge seat (15) for the tightening portion (8) at a front end (14) thereof.

13. The electrical junction device (2) of claim 12, wherein:
the anti-extraction seat (15) forms a hole portion (17) with a smaller inner diameter than the inner diameter of a directly bordering portion of the longitudinal hole (12), as well as an inner shoulder (16) facing the tool seat (4),
the tightening portion (8) forms a pin (18) having an enlarged end (19),
wherein the pin (18) is inserted into the hole portion (17) with a smaller diameter and the enlarged end (19) is trapped by the inner shoulder (16) in order to prevent the tightening portion (8) from detaching from the threaded portion (5).

14. The electrical junction device (2) of claim 8, comprising:
a sliding interface (20), formed by two opposite planar sliding surfaces (20', 20") having a mutual maximum allowable distance determined by an anti-extraction support of a locally enlarged anchoring portion (19) of the tightening portion (8) against a locally narrowed hooking portion (16, 17) of the threaded portion (5), even with the screw (1) unscrewed, and/or
a third element (33) interposed between the threaded portion (5) and the tightening portion (8), and/or
an anti-friction material layer (34) interposed between the threaded portion (5) and the tightening portion (8), and/or an elastic member (35) interposed between the threaded portion (5) and the tightening portion (8).

\* \* \* \* \*